INVENTOR
CARL L. WEBER
RONALD H. WOLK
BY Nathaniel Ely
ATTORNEY united States Patent Office 3,475,134
Patented Oct. 28, 1969

3,475,134
LIQUID PHASE REACTOR
Carl L. Weber, Washington Crossing, Pa., and Ronald H. Wolk, Lawrence Township, Mercer County, N.J., assignors to Hydrocarbon Research, Inc., New York, N.Y., a corporation of New Jersey
Filed May 5, 1965, Ser. No. 453,429
Int. Cl. B01j 9/12
U.S. Cl. 23—288                                           4 Claims

ABSTRACT OF THE DISCLOSURE

Bubble cap and plate assembly for a reactor operating in liquid phase with particulate solids wherein a ball check valve is mounted on a valve seal in the riser in a manner to accelerate the upward velocity of the liquid through the valve to assure solids flow and to prevent down flow of solids through the valve when the upward liquid flow is discontinued.

---

This invention relates to a liquid phase reactor and is more particularly concerned with an improved form of apparatus for the contact of liquid, solids and gases in a high pressure reactor.

As described in the Johanson patent, 2,987,465, improved reactions between liquids, solids and gases can be accomplished by the so-called "ebullated bed" concept in which the gases and liquids flow upwardly through the reaction zone under conditions that tend to place the contact particles in random motion. It has been found that nearly isothermal conditions result when the catalyst or contact bed is expanded at least 10% and generally not more than 300%. It is also found that the random motion of the particles in the liquid avoids attrition and permits such control that substantially no solids are carried out of the reaction zone. In each ebullated system, variables which may be adjusted to attain the desired ebullation (random motion of the particles in the liquid) include the flow rate, density and viscosity of the liquid and the gasiform material, and the size, shape and density of the particulate material.

We have found that it is essential for uniform reactions that the liquid and gas be uniformly distributed across the horizontal cross-section of the reaction zone in order to maintain the bed of contact solids in a uniformly expanded condition with completely random motion of the individual particles. In certain reactions such as hydrogenation or hydrocracking of heavy gas oils or residuums, maldistribution causes dead spots where the catalyst is not in motion. This leads to the formation of agglomerates of catalyst particles by means of coking of quiescent oil at the catalyst surface. Coking of this type is self-catalyzing in that additional catalyst particles will become attached to the agglomerates since they are not in motion.

In those cases where contact material is recycled from the top of the catalyst bed back through the plenum chamber and distributor and then back into the bed, it is extremely important that none of the catalyst becomes lodged in the distributor. If this does happen, maldistribution will again result since the restricted caps will carry a lesser amount of gas or liquid.

The distributor must also be able to prevent the catalyst bed from draining back through it when the reactor is shut down and the liquid contained within the catalyst bed is drained back through it. If catalyst is allowed to drain back through the distributor it becomes impossible to restart the system since the distributor is restricted.

The principal object of our invention is to provide an improved device which allows the upward flow of solid, liquid, and gas with no danger of restriction and the reverse flow of only liquid and/or gas and which, at the same time, promotes a highly efficient distribution of those materials passing through the distributing device and into the reaction zone.

Further objects and advantages of the invention will appear from the following description of a preferred form of embodiment thereof when taken in connection with the attached drawing illustrative thereof in which.

Figure 1:
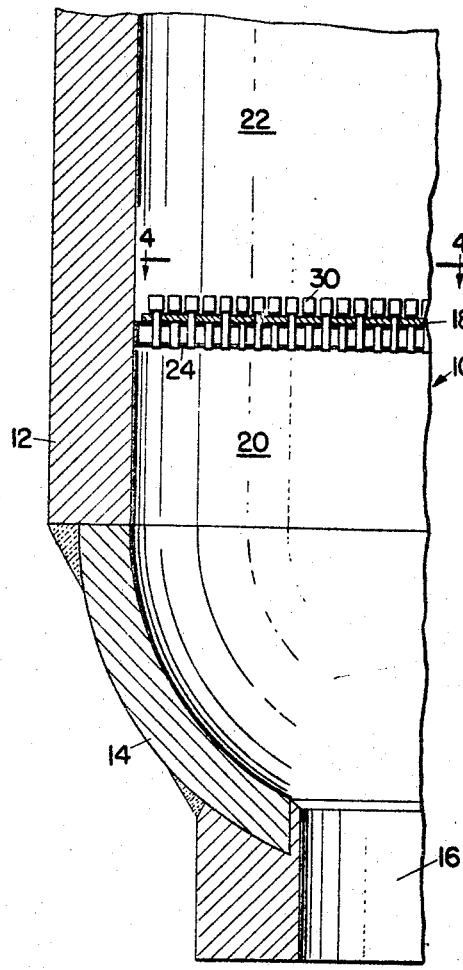
FIGURE 1 is a partial vertical section through the lower part of a high pressure reactor.
Figure 3:
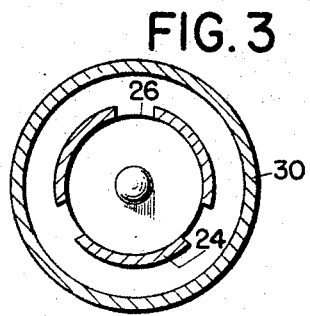
FIGURE 3 is a horizontal cross section taken substantially on the line 3—3 of FIGURE 2.

As more particularly shown in FIGURE 1, the reaction vessel generally indicated at 10 is a thick-walled, usually cylindrical vessel, adapted for a liquid-solids-gaseous contact, as for example, the hydrogenation of hydrocarbons in the presence of catalyst in which the pressures are usually in the range of 1000 to 5000 p.s.i.g. and in which the temperatures are usually in the range of 750°–850° F. It will be understood, however, that the following invention is adapted to many forms of liquid-solids-gaseous contact processes in which the temperatures and pressures and contact particles may have very wide ranges.

The reaction vessel 10 includes the side wall 12, a suitable bottom section 14 including a manhead receiving portion 16 which is adapted to receive a manhead having inlet passages for liquid and gas; such vessel will also have a similar top section which may have a suitable top closure, not shown.

Figure 4:
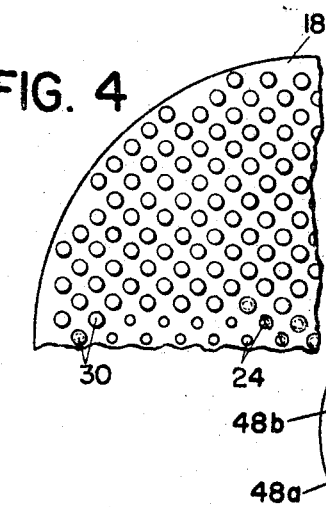
FIGURE 4 is a partial plan view of the fluid distributor deck taken along the line of 4—4 of FIGURE 1.
Figure 5:
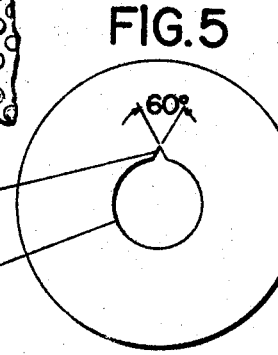
FIGURE 5 is a plan view of the orifice disc 48.

Within the lower part of the reaction vessel we provide a transverse distributor plate or partition or deck generally indicated at 18 which is uniformly perforated across the horizontal cross section as shown, for example, in FIG. 4. This permits the uniform flow of fluids from a lower chamber, generally designated 20, which may be a plenum chamber, into an upper chamber 22 which is usually the reaction zone. The deck or partition 18 is typical of a bubble cap tray and is suitably supported on the wall of the reactor 10 as by a channel 24.

Figure 2:
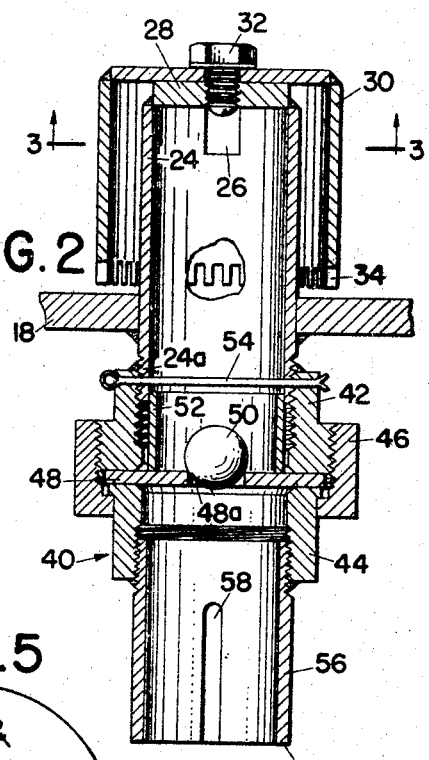
FIGURE 2 is an enlarged vertical section through a preferred form of gas and liquid distributor.

Our invention is more particularly directed to the cap and riser assembly more clearly shown in FIGURE 2. Within the various perforations through the deck 18 are certain risers generally indicated at 24 and preferably such risers are provided with liquid outlets generally indicated at 26 below the cap or top of the riser 28. The bubble cap itself indicated at 30 and secured as by the bolt 32 is of typical construction and may have a serrated lower edge 34 which is located above the surface of the deck.

The riser 24 provides the necessary rigid support for the bubble cap and extends below the deck to a sufficient extent to permit the attachment of our improved valve assembly generally indicated at 40. Preferably, this valve assembly may be fabricated from a pipe union including the upper coupling 42, the lower coupling 44 and the collar 46. A disc 48 having a central aperture 48a and drainage slots 48b on which is mounted a ball 50 is secured in place between the couplings 42 and 44. The disc 48 may be provided with a pipe sleeve 52 which fits within the lower portion 24a of the riser and limits the annular space around the ball. A pin 54 extends transversely of the parts and over the ball 50 to limit maximum vertical movement.

In addition, the cap and riser assembly includes an extension 56 which is preferably slotted as at 58 in such a manner that gases which may collect below the deck 18 can thus flow through the slot 58.

As will be apparent, the ball valve 50 will permit the upflow of liquid and gases through the aperture 48a and thence through the riser 24 and through the reversal parts 26 and down under the cap 30 and out the serrations 34 or under the cap to accomplish uniform distribution of fluids into the reaction zone 22. It is to be particularly understood that the construction is especially adapted for a liquid phase operation and the cap 30 is submerged in liquid under all normal operating conditions.

In some three phase systems, there are times when the liquid flowing upwardly through the extension 56 and past the ball valve 50 will contain some solids. The liquid flow is such that if the particles start up the extension 56 the velocities tend to increase across the aperture 48a and the solids will normally be carried with the liquid and out on to deck 18 and into the reaction zone.

Under shutdown or reverse conditions, in our apparatus solids will not backflow. When the elevating force of the liquid and gas on the ball 50 is insufficient to unseat the ball, liquid flow in a reverse direction will be arrested. As a result, any solids in the reaction zone 22 may drop out onto the deck 18 but as there is little reverse and upward liquid flow between the inside of the cap 30 and the riser 24, there is insufficient carrying force to carry solids back into the riser 24. To this extent, the cap and riser assembly is non-reversible as to solids flow and very slightly reversible as to any liquid or gas flow.

There are several absolute and relative dimensions which are critical in the design of this type of distributor. For example, it is important that the cross sectional area of the orifice 48a on which the valve ball 50 is seated be such that the liquid flowing through that opening will be at a velocity far in excess of the transport velocity of any particle passing up through that opening. All of the other flow areas within the distributor should be made larger than the orifice so that any tendency for particles to be trapped during any changes of flow direction should be minimized. However, it is necessary that all these areas be sized so that the liquid velocity through them will be above the transport velocity of those solids passing through the cap.

It is recommended that the diameter of the ball exceed the diameter of the orifice by no more than ⅛″ in order to provide that the ball seat somewhere near its mid height. The ball diameter must be greater than one-half the diameter of the riser tube above the orifice plate so that the ball seats in the hole at all times. Minimization of the amount of contacting between the ball and wall may be accomplished by making the clearance distance at least one-quarter inch. This is particularly valuable in eliminating breakdown of those catalyst particles which pass through the distributor.

The drainage slots 48b in the orifice plate should be sized to limit the backflow liquid velocity in the annular section between the cap and riser to less than that which will cause a 50% expansion of any catalyst which is in that zone. In conjunction with this a riser height of at least three inches above the deck will help to eliminate any catalyst backflow when draining liquid.

The prevention of restrictions in the annular section between the cap and riser can be accomplished by making the distance between them at least one-half inch.

Placing the lower edge of the slots at least one-quarter inch off the deck has been found to eliminate any catalyst restrictions in that area and produce a sweeping action on the deck area surrounding the cap.

While the construction as shown includes typical pipe joints, extension pieces and standard forms of pipe couplings and unions, it will be appreciated that these details are not essential to the invention although highly economical forms of construction. It is considered essential that the flow past the ball valve be precisely proportioned for the clearance between the bubble cap 30 and the deck 18, and it is also considered particularly desirable that the extension piece 56 be of sufficient length as to normally extend into the liquid in chamber 20 and that the gas entry slots 58 be of a size to pass gases which may collect under the deck 18 up into the reaction zone.

While we have shown a preferred form of embodiment of our invention, we are aware that other modifications may be made thereto within the scope and spirit of the description herein and of the claims appended hereinafter.

We claim:

1. In combination with a reaction vessel wherein a liquid and a gas are passed upwardly through a reaction zone containing a mass of finely divided contact particles, the conditions of liquid and gas flow being such as to maintain a liquid phase support of the particles which are placed in random motion by the liquid and gas, said reactor having a transversely extending partition in the lower part thereof, said partition having a plurality of substantially regularly and uniformly disposed perforations extending through the partition and communicating with the reaction zone above the partition and a plenum chamber therebelow, and bubble cap assemblies mounted in said perforations including risers and caps surmounting said risers, said risers and caps having openings communicating liquid flow upward through the bubble cap assembly, said bubble cap assemblies having ball check valves in the risers to prevent downflow of catalyst, and restrict the downflow of liquid, said ball check valves including a ball and a valve seat, said valve seat having an orifice adapted to be substantially closed by the ball, said ball diameter being greater than one half the diameter of the riser and having a minimum clearance of one quarter inch with the riser, the ball diameter being at least one eighth inch greater in diameter than the valve seat orifice so that the ball seats somewhere near its mid-height.

2. In combination with a reaction vessel as claimed in claim 1 wherein the cap has a clearance with respect to the riser of at least ½ inch.

3. A bubble cap assembly for use in a reaction vessel wherein a liquid and gas are passed upwardly through a reaction zone containing a mass of finely divided contact particles, the conditions of liquid and gas flow being such as to maintain a liquid phase support of said contact particles which are placed in random motion by the liquid and gas, and wherein said reaction vessel has a transversely extending partition having a plurality of substantially regularly and uniformly disposed perforations extending through the partition, said bubble cap assembly including risers and caps surmounting said risers, being mounted in said perforations, said risers and caps having openings communicating liquid flow upward through the bubble cap assembly, said bubble cap assembly having a ball check valve in the riser to prevent downflow of said contact particles, and restrict the downflow of liquid, said ball check valve including a ball and a valve seat, said valve seat having an orifice adapted to be substantially closed by the ball, said ball diameter being greater than one half the diameter of the riser and having a minimum clearance of one quarter inch with the riser, the ball diameter being at least one eighth inch greater in diameter than the valve seat orifice so that the ball seats somewhere near its mid-height, and the valve seat of the ball check valve having an orifice smaller than the internal diameter of the riser such that the velocity of the liquid flowing through said orifice is in excess of the transport velocity within said riser whereby contact particles entering said riser will be carried through said orifice.

4. The bubble cap assembly in claim 3 for use in a reaction vessel wherein the orifice of the valve seat contains a drainage slot, partially covered by the ball.

References Cited

UNITED STATES PATENTS

| | | | |
|---|---|---|---|
| 3,197,286 | 7/1965 | Farkas et al. | 23—288 |
| 2,539,847 | 1/1951 | McGrath | 23—288 |

FOREIGN PATENTS 485,050  10/1929  Germany.

JAMES H. TAYMAN, Jr., Primary Examiner

U.S. Cl. X.R.

23—283, 285; 261—114